Patented Mar. 27, 1934

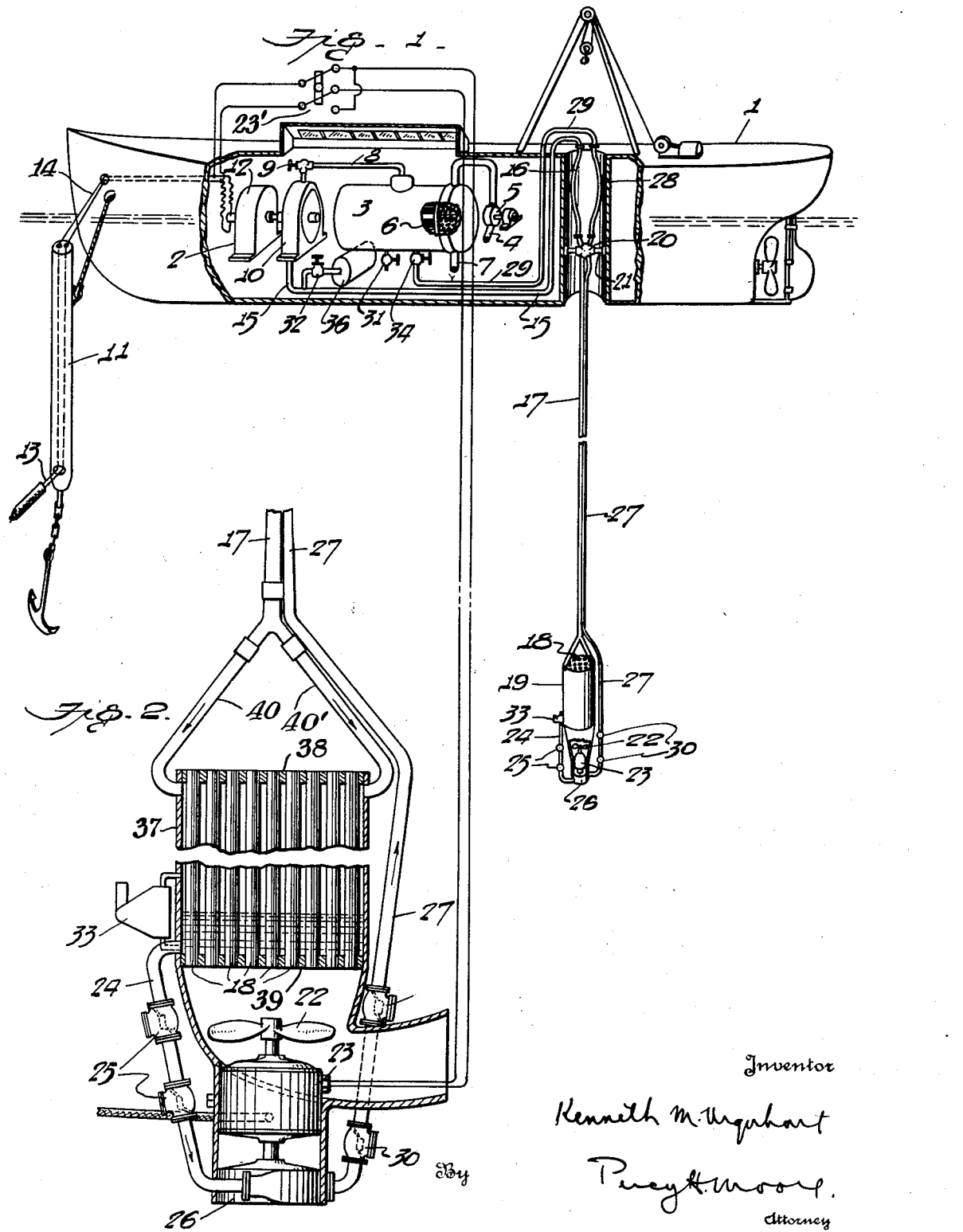

1,952,520

UNITED STATES PATENT OFFICE 1,952,520

CONDENSER

Kenneth M. Urquhart, Norfolk, Va.

Application February 2, 1932, Serial No. 590,462

2 Claims. (Cl. 257—26)

The present invention has for its general object the economical production of power by utilizing the differences in the heat content of sea water at the surface and in the depths, to alternately condense and vaporize a fluid operating medium or energy carrier such as propane.

Broadly the invention consists of apparatus for circulating a fluid operating medium or energy carrier in a closed circuit first through a pipe line extending from the comparatively warm surface of the ocean or other body of water to a condenser positioned at the end of the line in relatively deep or cold water.

The fluid operating medium in condensed form is pumped from the condenser back to the surface, picking up heat en route from the water, and is then passed through an evaporator through which warm surface water is circulated and in which expansion occurs. The expanding vapors operate a turbine directly connected to a generator from which electricity is conveyed to the adjacent shore.

In the drawing, which shows by way of illustration one embodiment of the invention;

Figure 1 is a sectional view of certain of the parts, illustrating diagrammatically the essential features of my invention; and Figure 2 is a side view partly in section of the condenser and associated mechanism.

Referring more particularly to the drawing wherein like reference numerals designate corresponding parts throughout the several views; 1 is a buoyant body such as a float or ship in which a power plant 2 is suitably installed. The ship 1 is preferably secured to a suitably anchored buoy 11, from which electric transmission lines 13 lead to the sea bottom and thence to shore, not shown.

An evaporator 3 filled with propane is constantly heated to a temperature of approximately 70° F. by water drawn from the ocean's surface through suction pipe 4, by means of pump 5. After being circulated through the tubes 6 of the evaporator the water is discharged back into the sea through waste pipe 7. The warm water in passing through the tubes of the evaporator gives up heat to the propane within the evaporator shell or casing thus converting the liquid or semi-liquid energy carrier into vapor, which passes through a pipe 8 and control valve 9 into turbine 10, where the vapor expands and furnishes the necessary power for driving the turbine. A generator 12 connected directly to the turbine generates electricity which flows from the generator through lines 14 to buoy 11 and thence through line 13 to shore.

The expanded vapors leave the turbine through exhaust pipe 15, thence to a flexible tube 16, and into the upper end of a vapor pipe line 17, leading to and communicating with the top of a condenser 19, suspended in cold deep water. The vapor pipe 17 is of great weight and consequently must be flexibly connected to the ship so that the rolling movements of the latter, particularly in rough weather, will not result in a leaky or otherwise damaged line. Thus the pipe 17 is connected to and supported by a socket member 20 having a universal joint connection with the ship, as at 21. Flexible tube 16 is also connected to the socket 20 and communicates there-through with the pipe 17. As the vapors pass down through pipe 17 and finally into and through the condenser the vapors are cooled to about 45° F. Condenser 19 embodies a cylindrical container 37 having a plurality of cooling tubes 18 extended therethrough. These tubes are mounted in the top and bottom walls 38 and 39 of container 37 to permit of circulation of the surrounding cooling water therethrough when a propeller 22 is rotated by means of a reversible motor 23. A switch 23' controls the directions of rotation of motor 23 and permits reversion of the direction of rotation of propeller 22, should the tubes 18 become clogged with seaweed or the like. The vapors passing down in pipe 17 are fed into the top part of container 37 through pipes 40, 40' and while condensing drop to the bottom of container 37 from whence they pass through pipe 24 and check valves 25 therein to a centrifugal pump 26, also driven from motor 23. Pump 26 forces the condensed propane vapors up through check valves 30 in feed line 27, paralleling the line 17 and communicating at its upper end through the socket member or coupling 20, with a flexible pipe 28. This flexible pipe carries the condensed vapors to the evaporator through a pipe 29 thus completing the cycle. A valve 31 in the bottom of evaporator 3, permits of any salt water which may leak into the system to be readily drained. Exhaust line 15 is also provided with valve 32, through which the propane in the system may be supplemented from any suitable source of supply, such as tank 36.

The cooling system described can readily be cleaned while in operation. Thus, when the motor is reversed for cleaning the cooling system of the condenser, the propeller 22, now rotating in opposite direction reverses the direction of flow of the liquid passing therethrough, and pump 26 also reverses its rotation. However a discharge of condensed vapor back into the condenser is stopped by the check valves 25 in pipe 24, so that the condenser continues its condensing operation.

Having thus described my invention, what I claim is:

1. A condenser unit for condensing vapors by heat exchange with a cooling medium surrounding said condenser comprising a unit having a plurality of tubular means attached thereto for suspending said unit and feeding vapors to said condenser through one of said tubular means, means supported by said unit for circulating the surrounding medium therethrough, means for discharging the condensed vapor into another one of said tubular means and a single motor for driving said circulating means and said discharge means.

2. A condenser unit for condensing vapors by heat exchange with a cooling medium surrounding said condenser comprising a unit having a plurality of tubular means attached thereto for suspending said unit and feeding vapors to said condenser through one of said tubular means, means supported by said unit for circulating the surrounding medium therethrough, means for discharging the condensed vapor into another one of said tubular means, a pipe line connecting said condenser with said discharge means, a reversible motor for driving the circulating means and said discharge means and means in said pipe line to prevent the condensed vapor from flowing back into said condenser, when the rotation of said motor is reversed.

KENNETH M. URQUHART.